(12) United States Patent
Drinkwater

(10) Patent No.: US 10,486,002 B1
(45) Date of Patent: Nov. 26, 2019

(54) FALL ARREST SYSTEM

(71) Applicant: Ascend Safe Limited, New Plymouth (NZ)

(72) Inventor: Derek Cameron Drinkwater, New Plymouth (NZ)

(73) Assignee: Ascend Safe Limited, New Plymouth (NZ)

( * ) Notice: Subject to any disclaimer, the term of this patent is extended or adjusted under 35 U.S.C. 154(b) by 0 days.

(21) Appl. No.: 16/107,501

(22) Filed: Aug. 21, 2018

(51) Int. Cl.
*F16M 13/00* (2006.01)
*A62B 35/00* (2006.01)
*A62B 35/04* (2006.01)
*A01F 25/16* (2006.01)

(52) U.S. Cl.
CPC .......... *A62B 35/005* (2013.01); *A62B 35/04* (2013.01); *A01F 25/16* (2013.01)

(58) Field of Classification Search
CPC .... A62B 35/0043; A62B 35/005; A62B 35/04
See application file for complete search history.

(56) References Cited

U.S. PATENT DOCUMENTS

| | | |
|---|---|---|
| 1,045,840 A | 12/1912 | Hedrick |
| 3,179,994 A | 4/1965 | Meyer et al. |
| 3,908,791 A | 9/1975 | Kleine et al. |
| 4,399,890 A | 8/1983 | Bartels et al. |
| 4,699,245 A | 10/1987 | Benedet |
| 5,220,977 A | 6/1993 | Wolner |
| 5,265,696 A | 11/1993 | Casebolt |
| 8,261,878 B2 * | 9/2012 | Grome ................ E04H 7/065 182/9 |
| 9,616,255 B1 * | 4/2017 | Liddle ................ A62B 35/0062 |
| 2010/0078262 A1 * | 4/2010 | Townend .......... A62B 35/0062 182/36 |
| 2015/0238786 A1 * | 8/2015 | Galpin ............. A62B 35/0081 182/36 |

FOREIGN PATENT DOCUMENTS

EP  2952654 A1  12/2015

* cited by examiner

*Primary Examiner* — Amy J. Sterling
(74) *Attorney, Agent, or Firm* — Taft Stettinius & Hollister LLP

(57) ABSTRACT

A fall arrest system for a silo having a ladder is described. Silos typically have a slopping top and substantially vertical sides. Typically, multiple independent fail arrest systems are used, one for the sloping top and one for the vertical sides. The single fall arrest system described includes: a safety cable, having a top end and a bottom end, to which in use a user connects to; a collar for fitting at the top of the silo, around the neck of the silo to which the top end of safety cable is attached; a pulley at the transition of the slopping top and substantially vertical sides, wherein the pulley supports the safety cable at the transition; and securing means for securing the bottom of the safety cable at the base of the silo.

13 Claims, 4 Drawing Sheets

FALL ARREST SYSTEM

This invention relates to a fall arrest system and in particular a fall arrest system for an agricultural silo.

BACKGROUND

Fall arrest systems that users attach to are known. However typically in situations involving a non-linear path including a substantial vertical and at least partial inclined path a user typically has to change from one safety system to another. In agricultural silos typically the fall arrest system in integrated with the ladder.

It would be desirous to provide a fall arrest system where the cable is continuous between the top mount, where the cable is supported independently of the ladder such that the user is protected at all points of the silo ladder.

It is an object of the invention to provide an improved fall arrest system or to at least provide the public with a useful choice.

SUMMARY

According to one example embodiment there is provided a fall arrest system for a silo having a ladder, a slopping top and substantially vertical sides comprising:
 a safety cable, having a top end and a bottom end, to which in use a user connects to;
 a collar for fitting at the top of the silo, around the neck of the silo to which the top end of safety cable is attached;
 a pulley at the transition of the slopping top and substantially vertical sides, wherein the pulley supports the safety cable at the transition; and
 securing means for securing the bottom of the safety cable at the base of the silo.

Preferably including a shock absorber connected between the collar and the top end of safety cable.

Preferably including a resilient device between the bottom end of the safety cable and the securing means.

Preferably the resilient member is a spring.

Preferably including a securing tie connected substantially opposite the safety cable to the collar, wherein in use the tie attaches to the top of the silo.

Preferably the safety cable is stainless steel.

Alternatively, the safety cable is steel.

Preferably the silo is an agricultural silo.

Alternatively, the silo is a commercial silo.

Alternatively, the silo is an industrial silo.

Alternatively, the silo is a grain silo.

Alternatively, the silo is a feed silo.

Alternatively, the silo is a fertiliser silo.

Alternatively, the silo is a liquid silo.

According to a further example embodiment there is provided a silo including the fall arrest system described above.

According to a further example embodiment there is provided a kit for retrofitting to a silo comprising the fall arrest system described above.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which.

DETAILED DESCRIPTION

Figure 1:
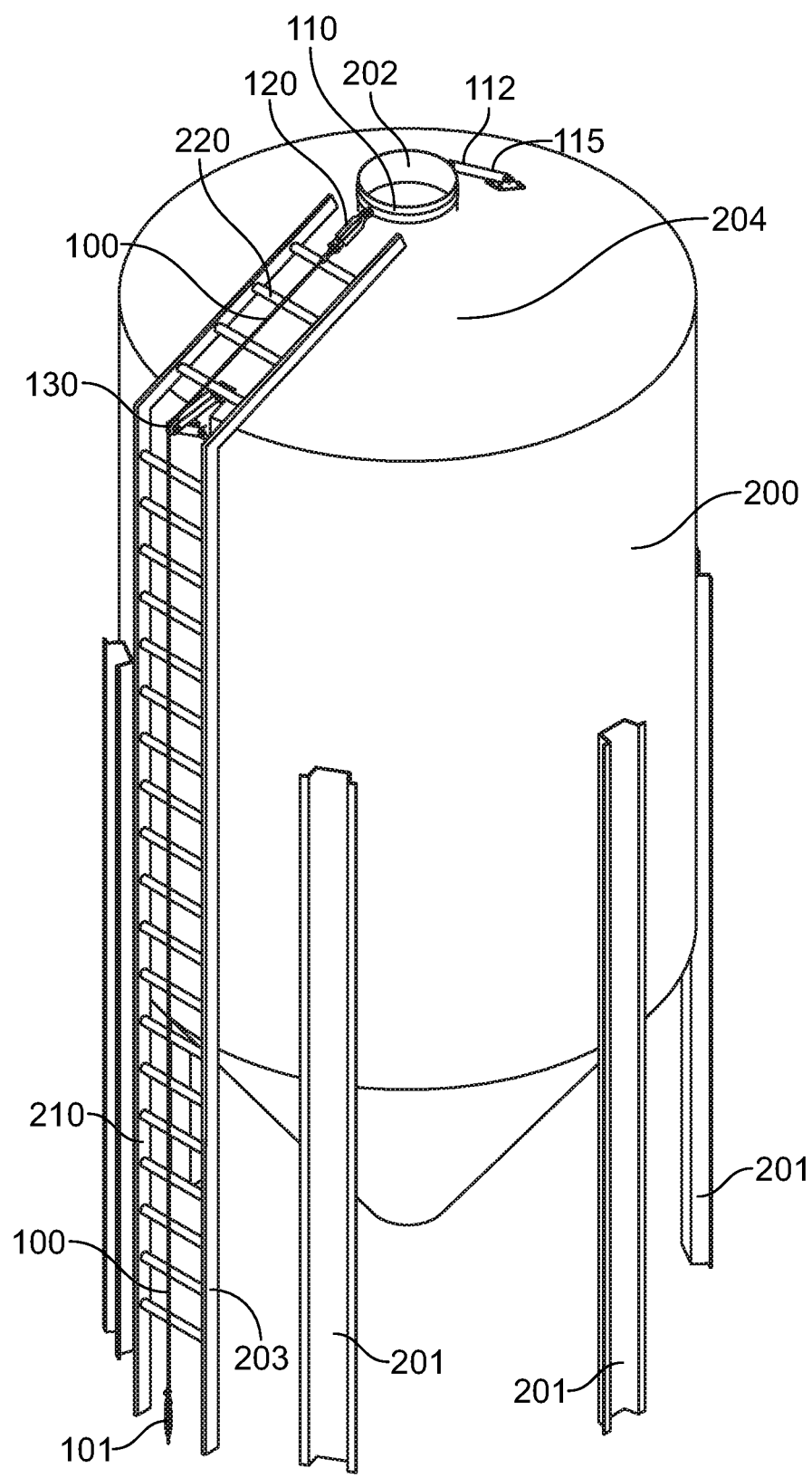
FIG. 1. is an isometric view a silo with the fall arrest system of the present invention installed.
Figure 2:
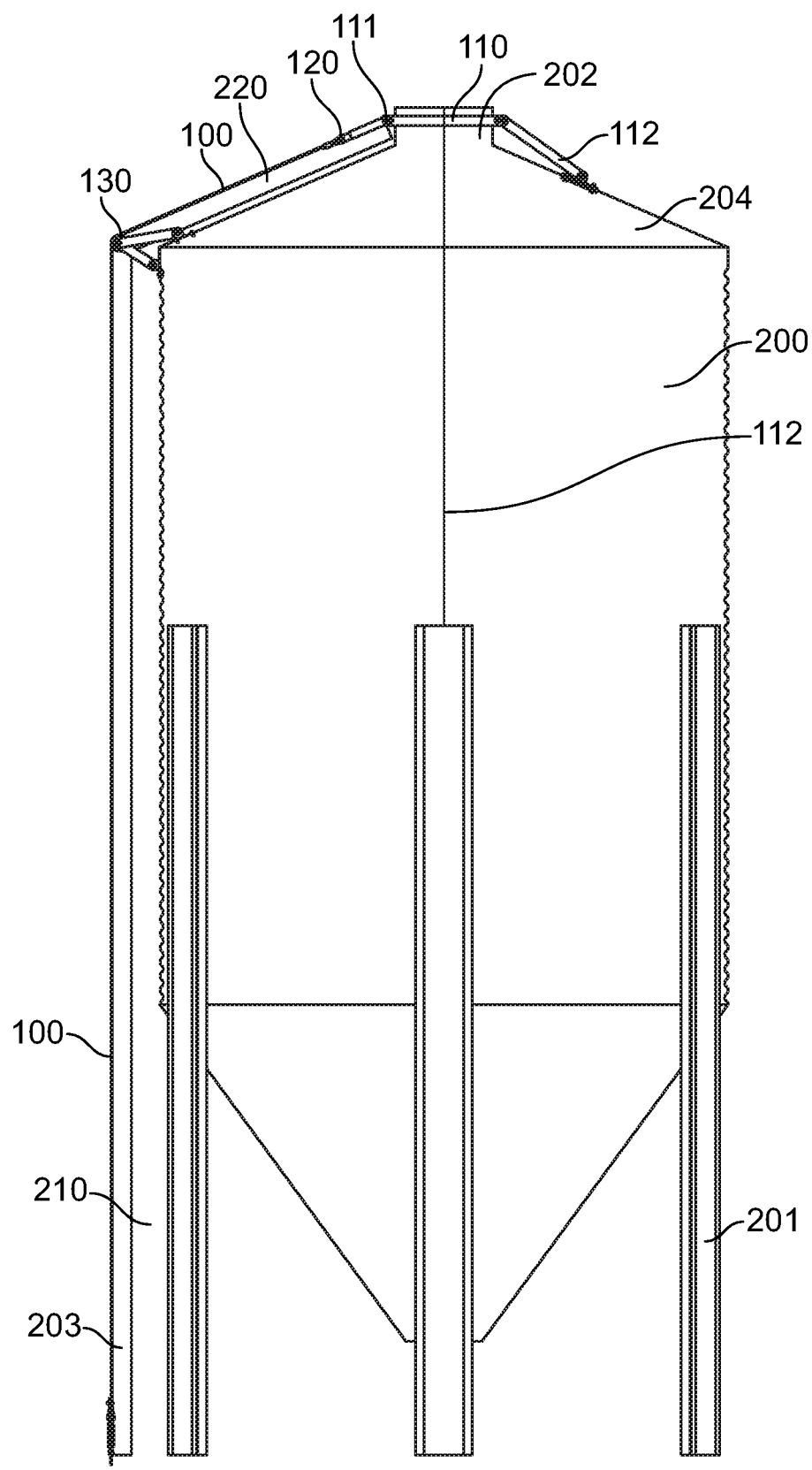
FIG. 2. is a side view a silo with the fall arrest system of the present invention installed.
Figure 3:
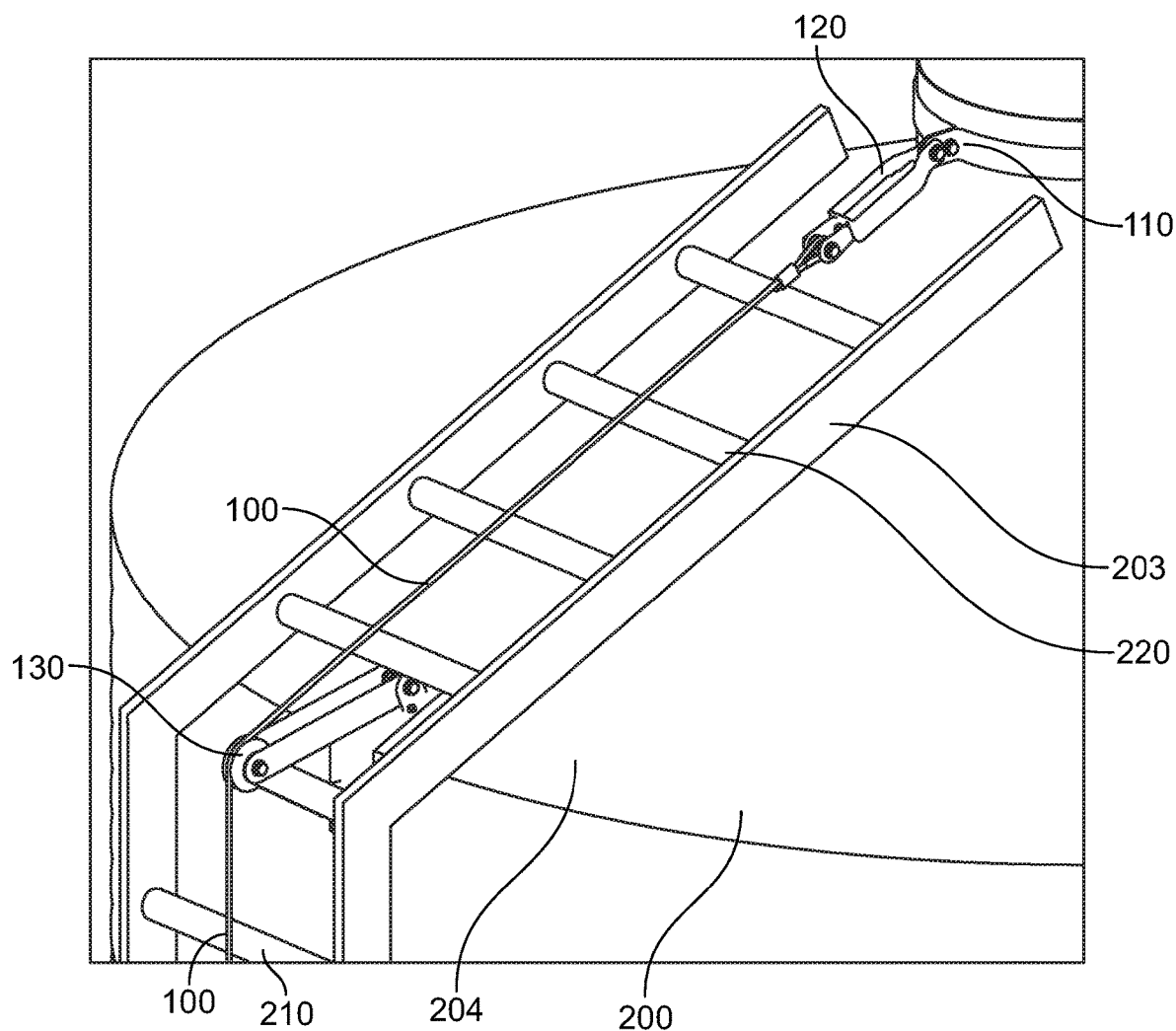
FIG. 3. is a partial isometric view a silo with the fall arrest system of the present invention installed.
Figure 4:
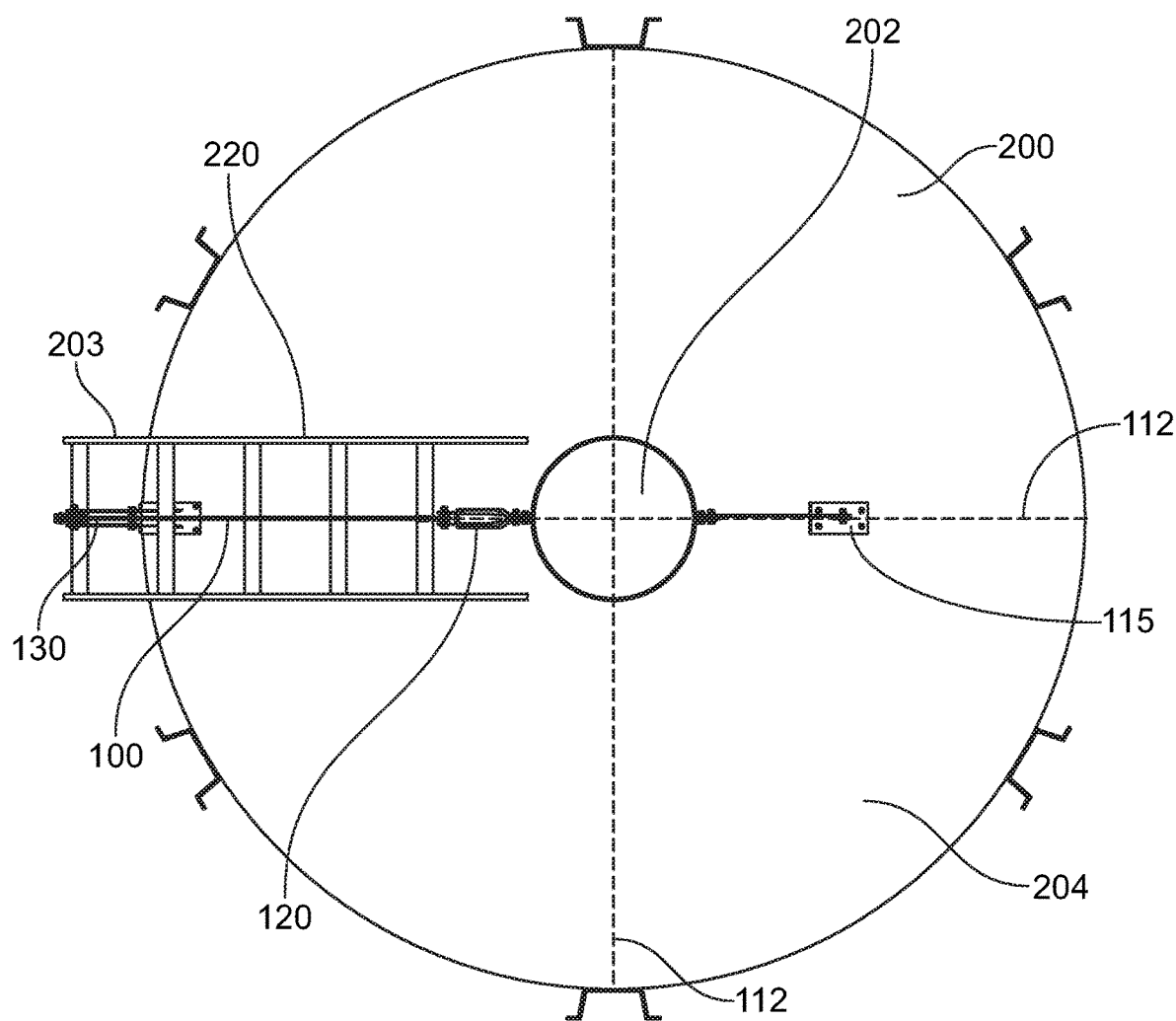
FIG. 4. is a top view a silo with the fall arrest system of the present invention installed.

Referring to FIGS. 1 to 4 example embodiments of the fall arrest system of the present invention are illustrated. A silo 200 typically used for storing grain or fertiliser on a farm is illustrated. The silo 200 has supporting legs 201 an access hatch 202 and a ladder 203 for access to the access hatch 202.

The fall arrest system of the present invention comprises a safety cable 100 to which a user attaches themselves. The safety cable is secured to the silo 200 via a collar 110 around the neck of the silo 200, more typically around the hatch 202 of the silo 200. A shock absorber 120 is connected between the collar 110 and the safety cable 100. The shock absorber 120 absorbs shock should a user fall and place load on the safety cable 100. At the opposite side of the collar 110 to the safety cable 100 and shock absorber 120 a securing tie 112 secures the collar 110 and thus the safety cable 100 to the silo 200. A resilient device 101, typically a spring at the bottom end of the safety cable at the bottom of the silo, holds the safety cable 100 taught. Alternatively, the safety cable may be secured at the base of the silo to an anchor.

The safety cable 100 would typically be stainless steel or steel but other suitable materials may be used.

Typically, silos 200 have a slopping top 204 such that the ladder 203 has a vertical portion 210 and a slopping portion 220. To enable the safety cable 100 to transition between the vertical portion 210 and the slopping portion 220 a pulley 130 supports the safety cable 100 over the transition.

The fall arrest system my optionally be provided as an integral part of a silo 200 or may be supplied as a kit to retrofit and existing silo 200.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A fall arrest system for a silo having a ladder, a slopping top and substantially vertical sides comprising:
    a safety cable, having a top end and a bottom end, to which in use a user connects to;
    a collar for fitting at the top of the silo, around the neck of the silo to which the top end of safety cable is attached;
    a shock absorber connected between the collar and the top end of safety cable;
    a pulley at a transition of the slopping top and substantially vertical sides of the silo, wherein the pulley supports the safety cable at the transition; and
    securing means for securing the bottom of the safety cable at a base of the silo.

2. The fall arrest system of claim 1 further including a resilient device between the bottom end of the safety cable and the securing means.

3. The fall arrest system of claim 2 wherein the resilient member is a spring.

4. The fall arrest system of claim 1 further including a securing tie connected substantially opposite the safety cable to the collar, wherein in use the securing tie attaches to the top of the silo.

5. The fall arrest system of claim 1 wherein the safety cable is stainless steel.

6. The fall arrest system of claim 1 wherein the safety cable is steel.

7. The fall arrest system of claim 1 wherein the silo an agricultural silo.

8. The fall arrest system of claim 1 wherein the silo a commercial silo.

9. The fall arrest system of claim 1 wherein the silo an industrial silo.

10. The fall arrest system of claim 1 wherein the silo is a grain silo.

11. The fall arrest system of claim 1 wherein the silo is a feed silo.

12. The fall arrest system of claim 1 wherein the silo is a fertiliser silo.

13. The fall arrest system of claim 1 wherein the silo is a liquid silo.

* * * * *